United States Patent
Hooli et al.

(10) Patent No.: US 12,556,012 B1
(45) Date of Patent: Feb. 17, 2026

(54) UNIVERSAL SERIAL BUS ADAPTER WITH QUICK CHARGING

(71) Applicant: Amazon Technologies, Inc., Seattle, WA (US)

(72) Inventors: Mahesh Hooli, San Jose, CA (US); Shengjun Hu, Shanghai (CN); Dibyendu Nandy, San Ramon, CA (US)

(73) Assignee: Amazon Technologies, Inc., Seattle, WA (US)

( * ) Notice: Subject to any disclaimer, the term of this patent is extended or adjusted under 35 U.S.C. 154(b) by 778 days.

(21) Appl. No.: 17/943,062

(22) Filed: Sep. 12, 2022

(51) Int. Cl.
- *H01M 10/46* (2006.01)
- *H02J 7/00* (2006.01)
- *H03K 17/687* (2006.01)

(52) U.S. Cl.
CPC ........ *H02J 7/0042* (2013.01); *H02J 7/00032* (2020.01); *H03K 17/687* (2013.01)

(58) Field of Classification Search
CPC ............................ H02J 7/0042; H02J 7/00032

USPC .................................. 320/107, 111, 114, 132
See application file for complete search history.

(56) References Cited

FOREIGN PATENT DOCUMENTS

| CN | 2703350 Y | * | 6/2005 | |
| CN | 110120662 A | * | 8/2019 | ............. H02H 9/046 |
| CN | 110190650 | | 8/2019 | |
| WO | WO-2022012644 A1 | * | 1/2022 | .......... H02J 7/00045 |

* cited by examiner

*Primary Examiner* — Edward Tso

(74) *Attorney, Agent, or Firm* — Eversheds Sutherland (US) LLP

(57) ABSTRACT

Systems and devices for a USB power adapter to provide power to meet requirements of a user device and identify the power adapter to the user device when connected are described. The systems include a USB adapter having a power, ground, and first and second signal connectors. The first and second signal connectors are connected to an integrated circuit of the USB adapter including a transistor. The first and second signal connectors are also connected to a diode arranged in parallel with the transistor.

19 Claims, 8 Drawing Sheets

UNIVERSAL SERIAL BUS ADAPTER WITH QUICK CHARGING

BACKGROUND

Various electronic devices (e.g., such as smartphones, tablets, notebook computers, laptop computers, hubs, chargers, adapters, etc.) are configured to transfer power through Universal Serial Bus (USB) connectors according to USB power delivery protocols defined in various revisions of the USB Power Delivery (USB-PD) specification. For example, in some applications an electronic device may be configured as a power consumer to receive power through a USB connector (e.g., for battery charging), while in other applications an electronic device may be configured as a power provider to provide power to another device that is connected thereto through a USB connector. The USB-PD specification, however, allows power providers and power consumers to dynamically negotiate the levels of the provided voltages and currents. Various electronic devices may require different power requirements that some USB connectors are not configured to provide.

BRIEF DESCRIPTION OF THE DRAWINGS

The detailed description is described with reference to the accompanying drawings. In the figures, the left-most digit(s) of a reference number identifies the figure in which the reference number first appears. The use of the same reference numbers in different figures indicates similar or identical components or features.

DETAILED DESCRIPTION

Figure 1:
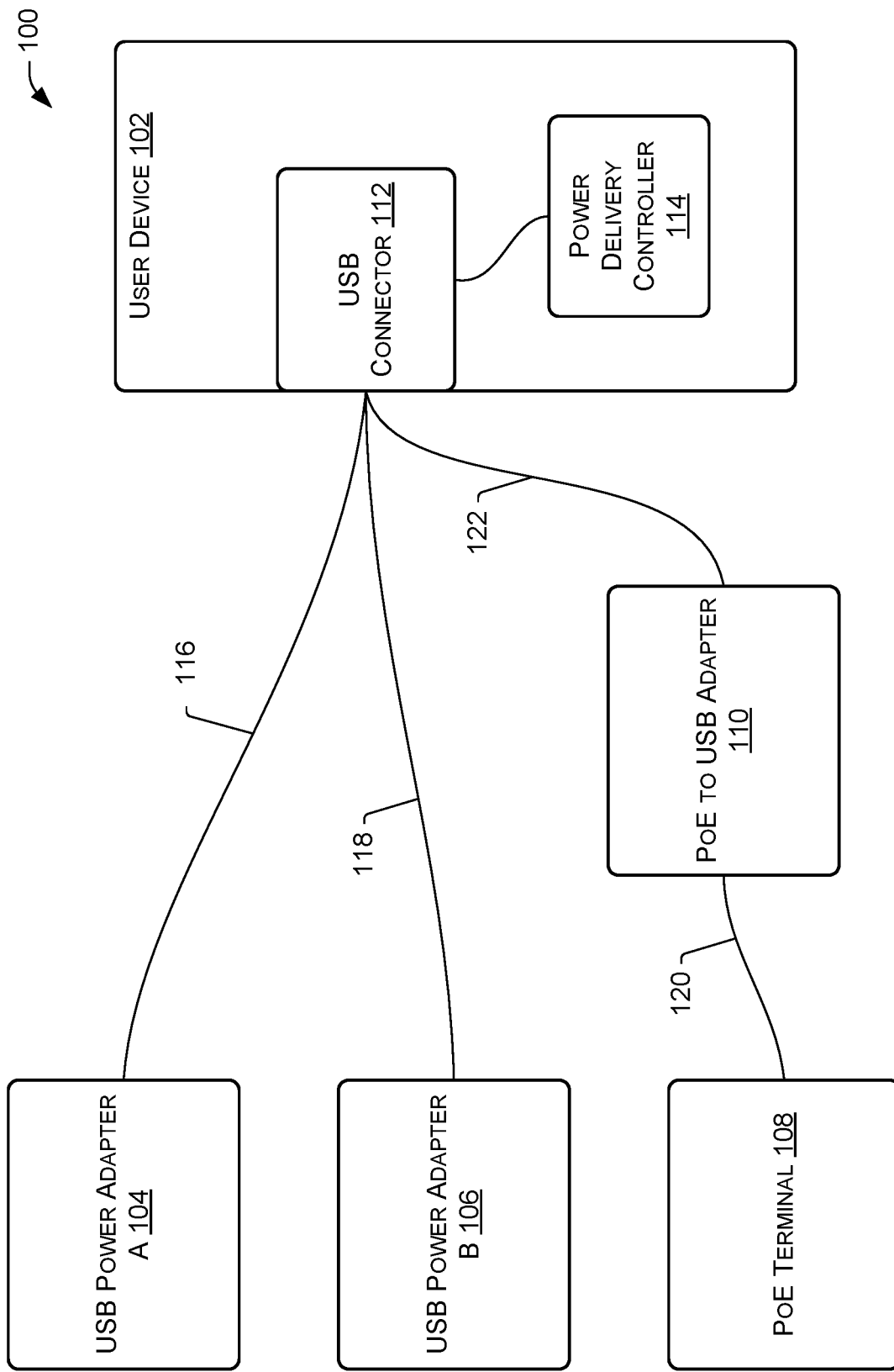
FIG. 1 illustrates an example block diagram of a user device connectable to different USB power adapters for providing power to the user device, the user device configured to detect compatible USB power adapters, according to at least some examples.

Described herein are, among other things, techniques, devices, and systems, for detecting USB power adapters, and more specifically for detecting USB power adapters capable of providing particular power requirements for a user device. The techniques and systems implement hardware, software, and firmware components to detect USB power adapters connected to a user device capable of providing power at a first level. In some examples, the user device may operate in a full performance state in response to the USB power adapter being capable and/or configured to provide power at the first level. The first level may include both average and peak power requirements and may define voltage and wattage power delivery requirements for the user device. In some examples, the user device may operate in a reduced performance state in response to a connected USB power adapter being configured to provide power at a second level that is lower than the first level.

Additional components described herein include USB power adapters configured to provide power at the first level. The USB power adapters include additional circuitry that enable detection and identification of the power adapter as configured to provide power at the first level. In a particular example, the USB power adapter may be a quick charge (QC) adapter that provides power at around 9 volts and average power of 12 watts. The power adapter described herein is also configured to provide peak power at up to 30 watts for user device consumption. A typical QC power adapter may be configured to provide only up to around 18 watts of power, and therefore may not be able to meet power requirements of some user devices.

Accordingly, the techniques and systems described herein provide for a power adapter that may provide greater power delivery to user devices as required and also for a technique for a user device to detect the power adapter and thereby take advantage of the greater power delivery to operate at a full operating capacity.

The USB power adapter as described herein includes a power connector for providing power through the USB power adapter to a device. The USB power adapter described herein may provide increased power delivery attributes over typical USB power adapters and/or QC power adapters. For example, the USB power adapter as described herein may be capable of providing 12 watts of power at 9 volts up to a peak power of 30 watts. The power may be provided from one or more sources, such as an electrical outlet, battery-powered source, generator, or other electrical source. The USB power adapter also includes a ground connector for providing a ground through the USB power adapter to the device as part of the power supply to the device. The USB power adapter includes a D+ signal connector and a D-signal connector that transfer data between a host and a device. For example, a host device may include a computing device, storage medium, or other device capable of transmitting data to a device. The D+ and D− signal connectors may also be used to detect an initial connection of the USB power adapter to the device. The D+ and D− signal connectors may also be referred to as DP and DN connectors in some examples. The USB adapter further includes an integrated circuit (IC) that may control one or more operations across the USB adapter, such as data transfer. Within the integrated circuit, various components may be used for detection of the USB adapter by devices, and control of output power, such as output voltage, current, and/or wattage. The integrated circuit includes a transistor (such as a Field Effect Transistor (FET) and/or a Metal-Oxide-Semiconductor Field Effect Transistor (MOSFET)) that may be used to amplify and/or switch signals within the USB power adapter, for example to change signals between different voltage signals or other such changes within the USB power adapter. The USB power adapter also includes a diode that is coupled between the D+ and the D− signal connectors. The diode is connected in parallel with the transistor and/or the integrated circuit. The diode therefore may be used to provide a signal that is detectable at the device when connected indicative of the type of USB power adapter. The diode provides a voltage loopback between the D+ and D− signal connectors that is detectable at the device and may be used for authentication of the USB power supply as a power supply compatible with the power requirements of the device.

Detection of the USB power adapter described above, may be performed using components within the device. In a first example, the USB power supply has a diode arranged in parallel with a transistor and/or IC as described above. The diode provides a voltage loop via the D+ and D− signal connectors that may be used for authentication. In the example, a power detection circuit of the device may include a USB multiplexer that enables the USB connector of the device to be switched between different components or powered off entirely. The power detection circuit also includes a voltage generator that may be used to produce and/or cause output of a voltage signal at a predetermined voltage value across the D+ and D− signal connectors. The power detection circuit also includes a voltage comparator that may detect a signal returned from the voltage loop via the D+ and D− signal connectors. The power detection circuit also includes a QC controller for controlling charging and/or power delivery to the device from the USB connector of the device.

Upon power up or booting of the device, the QC Controller will detect a power connection with a requirement for a particular USB power source type for the device. When a power source is detected by the QC controller, the USB multiplexer will cause the D+ and D− signal connectors to receive a voltage signal from the voltage generator. The voltage signal may, for illustrative purposes, be a 3.3-volt signal from the voltage generator. The USB multiplexer will also cause the voltage comparator to be connected with the D+ and D− signal connectors. The voltage generator outputs the 3.3-volt signal on the D− signal connector. The D+ signal connector is monitored by the voltage comparator. If the voltage comparator determines that the voltage on the D+ line is less than a threshold value, 2.8 volts for example, then the voltage comparator may generate a signal to deliver to a management component of the device, such as a system-on-a-chip (SoC) that manages one or more operations of the device. The SoC will boot up in a first state in response to receiving the signal from the voltage comparator. The first state may be a full performance mode where the device operates in a high-performance profile that may consume greater power and may provide improved performance. If the voltage comparator does not convey the signal to the SoC, or if the signal indicates that the power supply is not returning the expected voltage across the D+ and D− signal connectors, then the SoC will cause the device to boot in a second state. The second state may be a low performance mode where power consumption of the components of the device is limited, for example by throttling performance of one or more components, such as a processor of the device. In some examples, the device may also generate and display a message indicating that the device is in the second state and recommending connecting a compatible USB power source to achieve performance in the first state.

In a second example, detection of the USB power adapter described herein is implemented by monitoring current and voltage values within the device when connected to the power adapter. In the second example, the SoC of the device includes an analog to digital converter (ADC) for data capture and analysis. Current and voltage monitoring devices as well as an electronic load circuit are connected to the ADC. The electronic load circuit serves as a representative load such that the device may draw current from the USB power source. The electronic load circuit may be varied and/or controlled based on a pulse width modulation signal from the SoC to change the simulated load on the circuit.

Initially, a look up table may be created for the device by sampling voltage and current at the ADC using different resistance at the cable between the power source and the ADC. Through testing on devices with varying resistance, using a variable resistor, current and voltage values at the ADC may be charted in the look up table to correspond with resistance values for the power cable. The look up table may be stored in a storage medium on the device and accessible during a booting process of the device.

During power detection on the device, a resistance value is estimated using the look up table and measured voltage and current values at the ADC when connected to the USB power source. Sampling the voltage and current values may include sampling at varying loads, for example by sampling a first voltage value for a first period of time while no load is at the ADC. In some examples the first voltage value may be an instantaneous voltage and/or an average voltage value over the first period of time. Subsequently, after the first period of time, the electronic load may be configured, by the pulse width modulation signal, to draw a first current during a second period of time. The voltage at the ADC may be sampled again at the second period of time. Using the voltage at the first period of time, the voltage at the second period of time, the load of the electronic load, and the look up table, the power cable resistance may be determined. In some examples, the resistance value may be determined by subtracting the voltage during the second period of time from the voltage during the first period of time and dividing the result by the amperage value of the load at the electronic load. When the power cable resistance is greater than a threshold amount, it may be indicative of the USB power adapter not being compatible, e.g., not being capable of supplying the power requirements for full performance of the device. This may be due to the lack of the diode within the USB power adapter, which if present, would enable the resistance to be below the threshold value. The SoC will boot up in a first state in response to determining that the resistance is below the threshold, which is indicative of the USB power adapter being capable of delivering the full performance power requirements of the device. The first state may be a full performance mode where the device operates in a high-performance profile that may consume greater power and may provide improved performance, for example by allowing a processor to operate at full capacity. If the resistance is above the threshold value, then the SoC will cause the device to boot in a second state. The second state may be a low performance mode where power consumption of the components of the device is limited, for example by throttling performance of one or more components, such as a processor of the device. In some examples, the device may also generate and display a message indicating that the device is in the second state and recommending connecting a compatible USB power source to achieve performance in the first state.

The device may also be capable of detecting and/or verifying a peak power capability of the USB power adapter using the components described above. In some examples, the device may verify the peak power capability by applying a pulse load on the device's input supply, for example using the electronic load, and recording voltage during the pulse load. In a more particular example, during the boot up process for the device, if a QC adapter is detected, meaning an adapter that may not be capable of providing the power requirements for the device, then the device may cause the SoC to configure to ADC for sampling data at a first sampling rate for a first time period. The sampling rate may be a rate of 1 kilohertz, though other rates may be used. The voltage at the ADC during the first time period may be determined as a voltage without any load on the ADC. The electronic load may then be configured to pulse a current value for a second time period. The current value may be a peak current and may be pulsed with a particular duty cycle, such as a 5% duty cycle during the pulsing. During the second time period, the voltage at the ADC is measured, as well as the current at the ADC. In some examples, the voltage and current may be measured for a time period that extends beyond the end of the second time period. For example, the current may be pulsed for 5 milliseconds (with a 95 millisecond off stage due to the 5% duty cycle) though the voltage and current may be measured over a period of up to or exceeding 10 seconds. The moving average and maximum voltage drop for the voltage and current values over the measurement time period may be determined after collecting the data. The look up table may then be referenced based on the moving average and maximum voltage drop to determine the power cable resistance value. The SoC will boot up in a first state in response to determining that the resistance is within a threshold amount of a resistance value associated with the USB power adapter. The first state may be a full performance mode where the device operates in a high-performance profile that may consume greater power and may provide improved performance. If the resistance is outside of the threshold amount, then the SoC will cause the device to boot in a second state. The second state may be a low performance mode where power consumption of the components of the device is limited. In some examples, the device may also generate and display a message indicating that the device is in the second state and recommending connecting a compatible USB power source to achieve performance in the first state.

The techniques and components described herein may be implemented with a variety of USB-enabled devices. A USB-enabled electronic device or a system may comply with at least one release of a USB specification. Examples of such USB specifications include, without limitation, the USB Specification Revision 2.0, the USB 3.0 Specification, the USB 3.1 Specification, and/or various supplements (e.g., such as On-The-Go, or OTG), versions and errata thereof. The USB specifications generally define the characteristics (e.g., attributes, protocol definition, types of transactions, bus management, programming interfaces, etc.) of a differential serial bus that are required to design and build standard communication systems and peripherals. For example, a USB-enabled peripheral device attaches to a USB-enabled host device through a USB port of the host device to form a USB-enabled system. A USB 2.0 port includes a power voltage line of 5V (denoted VBUS), a differential pair of data lines (denoted D+ or DP, and D− or DN), and a ground line for power return (denoted GND). A USB 3.0 port also provides the VBUS, D+, D−, and GND lines for backward compatibility with USB 2.0. In addition, to support a faster differential bus (the USB SuperSpeed bus), a USB 3.0 port also provides a differential pair of transmitter data lines (denoted SSTX+ and SSTX−), a differential pair of receiver data lines (denoted SSRX+ and SSRX−), a power line for power (denoted DPWR), and a ground line for power return (denoted DGND). A USB 3.1 port provides the same lines as a USB 3.0 port for backward compatibility with USB 2.0 and USB 3.0 communications but extends the performance of the SuperSpeed bus by a collection of features referred to as Enhanced SuperSpeed.

An additional technology for USB connectors, called USB Type-C, is defined in various releases and/or versions of the USB Type-C specification. The USB Type-C specification defines Type-C receptacle, Type-C plug, and Type-C cables that can support USB communications as well as power delivery over newer USB power delivery protocols defined in various revisions/versions of the USB-PD specification. Examples of USB Type-C functions and requirements may include, without limitation, data and other communications according to USB 2.0 and USB 3.0/3.1, electro-mechanical definitions and performance requirements for Type-C cables, electro-mechanical definitions and performance requirements for Type-C receptacles, electro-mechanical definitions and performance requirements for Type-C plugs, requirements for Type-C to legacy cable assemblies and adapters, requirements for Type-C-based device detection and interface configuration, requirements for optimized power delivery for Type-C connectors, etc. According to the USB Type-C specification(s), a Type-C port provides VBUS, D+, D−, GND, SSTX+, SSTX−, SSRX+, and SSRX− lines, among others. In addition, a Type-C port also provides a Sideband Use (denoted SBU) line for signaling of sideband functionality and a Configuration Channel (denoted CC) line for discovery, configuration, and management of connections across a Type-C cable. A Type-C port may be associated with a Type-C plug and/or a Type-C receptacle. For ease of use, the Type-C plug and the Type-C receptacle are designed as a reversible pair that operates regardless of the plug-to-receptacle orientation. Thus, a standard USB Type-C connector, disposed as a standard Type-C plug or receptacle, provides terminals for four VBUS lines, four ground return (GND) lines, two D+ lines (DP1 and DP2), two D− lines (DN1 and DN2), two SSTX+ lines (SSTXP1 and SSTXP2), two SSTX− lines (SSTXN1 and SSTXN2), two SSRX+ lines (SSRXP1 and SSRXP2), two SSRX− lines (SSRXN1 and SSRXN2), two CC lines (CC1 and CC2), and two SBU lines (SBU1 and SBU2), among others.

Some USB-enabled electronic devices may be compliant with a specific revision and/or version of the USB-PD specification. The USB-PD specification defines a standard protocol designed to enable the maximum functionality of USB-enabled devices by providing more flexible power delivery along with data communications over a single USB Type-C cable through USB Type-C ports. The USB-PD specification also describes the architecture, protocols, power supply behavior, parameters, and cabling necessary for managing power delivery over USB Type-C cables at up to 100 W of power. According to the USB-PD specification, devices with USB Type-C ports (e.g., such as USB-enabled devices) may negotiate for more current and/or higher or lower voltages over a USB Type-C cable than are allowed in older USB specifications (e.g., such as the USB 2.0 Specification, USB 3.1 Specification, the USB Battery Charging Specification Rev. 1.1/1.2, etc.). For example, the USB-PD specification defines the requirements for a power delivery contract (PD contract) that can be negotiated between a pair of USB-enabled devices. The PD contract can specify both the power level and the direction of power transfer that can be accommodated by both devices, and can be dynamically re-negotiated (e.g., without device un-plugging) upon request by either device and/or in response to various events and conditions, such as power role swap, data role swap, hard reset, failure of the power source, etc.

According to the USB-PD specification, an electronic device is typically configured to deliver power to another device through a power path configured on a USB VBUS line. The device that provides power is typically referred to as (or includes) a "provider" (or a power source), and the device that consumes power is typically referred to as (or includes) a "consumer" (or a power sink). A power path typically includes a power switch coupled in-line on the VBUS line and configured to turn the delivery of power on and off.

In one embodiment, a USB-PD power source can be configured to draw power from a direct current (DC) power source and can include a direct current-to-direct current (DC-DC) converter. In other embodiments, a USB-PD power source may be configured to draw power from an alternating current (AC) power adapter or from another AC source. Thus, as part of an alternating current-to-direct current (AC-DC) conversion, some implementations may use a large bulk capacitor on the power source side of the VBUS line in order to remove the AC component of the power signal. Turn-On and turn-Off of power switches (also referred to as power FETs) may allow for further circuit protection based on analysis of current and voltage conditions and the detection of faults.

Turning now to the figures, FIG. 1 illustrates a block diagram 100 of a user device 102 connectable to different USB power adapters for providing power to the user device 102, the user device 102 configured to detect compatible USB power adapters, according to at least some examples. In some examples, the user device 102 may include smartphones, tablets, notebook computers, laptop computers, hubs, chargers, adapters, etc.) are configured to transfer power through Universal Serial Bus (USB) connectors according to USB power delivery protocols defined in various revisions of the USB Power Delivery (USB-PD) specification. The user device 102 may be supplied with power through the USB power adapter A 104, the USB power adapter B 106, or the PoE terminal 108 through a PoE to USB adapter 110. The user device 102 is coupled to the USP power adapter A 104 through a cable 116, the user device 102 is also connected to the USB power adapter B 106 through a cable 118, and the used device 102 is coupled to the PoE to USB power adapter 110 through cable 122. The PoE to USB adapter 110 is coupled to the PoE terminal through cable 120. In some examples, the user device 102 may be capable of connecting to multiple devices or peripherals through the cables and may include multiple USB connectors 112 to enable such connections. The user device 102 is capable of determining compatible power adapters as described herein and may only be powered by power adapters that meet the power requirements of the device. In some examples, the user device 102 may be powered though other power adapters that do not meet the power requirements of the user device 102 by booting or operating the device in a low power state.

In a particular example, the user device 102 is configured to operate and receive power from a 9-volt power supply. The USB power adapter A 104 may be a specific user device manufacturer recommended power adapter that provides power at 5 volts and/or 9 volts via a high voltage downstream charge port. The USB power adapter A 104 may be rated for 12-watt average power with peak power delivery up to 30 watts. The USB power adapter B 106 may be a power delivery source from a third party that does not support the peak power requirement of up to 30 watts but may instead have a peak power of only 18 watts. The USB power adapter B 106 may therefore only be capable of powering the user device 102 in the low performance mode. The PoE to USB adapter may be capable of receiving power and data communications from the PoE terminal 108 and support data communication to the user device 102 over the D+ and D− signal lines in addition to the 9 volt and 30-watt peak power delivery requirements. Though described with respect to particular voltage, current, and/or wattage requirements, it is understood that the techniques described herein are not limited to such example values but is practicable through a wide range of values for each.

One of the power adapters depicted in FIG. 1 may connect to the user device 102 at the USB connector 112 and a power delivery controller 114 of the user device 102 may determine whether the power adapter is configured to provide the user device 102 with power at the specified rates. When the power adapter is connected to the user device 102, the power delivery controller 114 may detect the USB power adapter and determine the type of power adapter. The power delivery controller may operate during a boot up process of the user device and may suspend boot up until the USB power adapter and power capabilities are determined, as the user device 102 may continue to boot in a high performance or low performance mode in some examples based on the power adapter.

Detection of the USB power adapter may be performed using components within the user device 102. In a first example, the USB power adapter A 104 may include a diode arranged in parallel with a transistor and/or IC as described in detail with respect to FIG. 2. The diode provides a voltage loop via the D+ and D− signal connectors that may be used for authentication. Upon power up or booting of the user device 102, the power delivery controller 114 may cause the D− signal connector of the USB power adapter A 104 to receive a voltage signal. The voltage signal may, for illustrative purposes, be a 3.3-volt signal from a voltage generator controlled at least in part by the power delivery controller 114. The power delivery controller may then determine a voltage of the D+ signal connector. When the voltage determined at the D+ signal connector is below a threshold value, such as 2.8 volts for example, then the power delivery controller 114 may determine that the USB power adapter A 104 is a manufacturer recommended power adapter and may cause the user device 102 to boot up in a first state that may be a full performance mode where the device operates in a high-performance mode that may consume greater power and may provide improved performance.

In some examples, such as when the USB power adapter B 106 is connected to the USB connector 112, the power delivery controller 114 may determine that the voltage on the D+ signal connector is greater than the threshold, then the user device 102 may boot in a second state. The second state may be a low performance mode where power consumption of the components of the device is limited. In some examples, the user device 102 may also generate and display a message at a display of the user device 102 indicating that the user device 102 is in the second state and recommending connecting a compatible USB power source to achieve performance in the first state. In some examples, the device may generate an alert in a manner other than or in addition to the displayed message including an audio output of the message or of an indicator such as a beep or a tone, a visual output of a light that may be pulsed in a particular manner or using a particular color (e.g., a red flashing light), a haptic output, or other such output to alert a user to the limited power deliver attributes of the power adapter B 106 and/or that the device is operating in the second state.

In some examples, the power delivery controller 114 may detect the power adapter by monitoring current and voltage values within the device when connected to the power adapter. For example, the PoE to USB adapter 110 may not include the diode described above but may be a power adapter capable of meeting the power requirements of the user device 102. The power delivery controller 114 may use current values at an analog to digital converter (ADC) of the user device to detect the capability of the PoE to USB adapter 110. Current and voltage monitoring devices as well as an electronic load circuit are connected to the ADC within the user device 102 as depicted and described with respect to FIG. 3. The electronic load circuit serves as a representative load such that the device may draw current from the USB power source. The electronic load circuit may be varied and/or controlled based on a pulse width modulation signal from the SoC to change the simulated load on the circuit.

Initially, a look up table may be created for the device by sampling voltage and current at the ADC using different resistance at the cable between the power source and the ADC. Through testing on devices with varying resistance, using a variable resistor, current and voltage values at the ADC may be charted in the look up table to correspond with resistance values for the power cable. The look up table may be stored in a storage medium on the device and accessible during a booting process of the device.

During power detection on the user device 102, a resistance value for the power cable is estimated using the look up table and measured voltage and current values at the ADC when connected to the PoE to USB adapter 110. Sampling the voltage and current values may include sampling at varying loads, for example by sampling a first voltage value for a first period of time while no load is at the ADC. Subsequently, after the first period of time, the electronic load may be configured, by the pulse width modulation signal, to draw a first current during a second period of time. The voltage at the ADC may be sampled again at the second period of time. Using the voltage at the first period of time, the voltage at the second period of time, the load of the electronic load, and the look up table, the power cable resistance may be determined by the power delivery controller 114. In some examples, the resistance value may be determined by subtracting the voltage during the second period of time from the voltage during the first period of time and dividing the result by the amperage value of the load at the electronic load. When the power cable resistance is greater than a threshold amount, it may be indicative of the PoE to USB adapter 110 not being compatible, e.g., not being capable of supplying the power requirements for full performance of the device. The user device 102 will boot up in a first state in response to determining that the resistance is below the threshold, which is indicative of the PoE to USB adapter 110 being capable of delivering the full performance power requirements of the device. The first state may be a full performance mode where the device operates in a high-performance profile that may consume greater power and may provide improved performance, for example by allowing a processor to operate at full capacity. If the determined resistance is above the threshold value, then the user device 102 will boot in a second state. The second state may be a low performance mode where power consumption of the components of the device is limited, for example by throttling performance of one or more components, such as a processor of the device. In some examples, the device may also generate and display a message indicating that the device is in the second state and recommending connecting a compatible USB power source to achieve performance in the first state. In some examples, the user device 102 may not boot at all in response to determining that the PoE to USB adapter may not meet the power delivery requirements.

The power delivery controller 114 may also be capable of detecting and/or verifying a peak power capability of the PoE to USB adapter 110 using the components described above. In some examples, the power delivery controller 114 may verify the peak power capability by applying a pulse load on the user device 102, for example using the electronic load, and recording voltage at the ADC during the pulsed load. The voltage at the ADC during the first time period may be determined as a voltage without any load on the ADC. The electronic load may then be configured by the power delivery controller 114 to pulse a current value for a second time period. The current value may be a peak current and may be pulsed with a particular duty cycle, such as a 5% duty cycle during the pulsing. During the second time period, the voltage at the ADC is measured, as well as the current at the ADC. In some examples, the voltage and current may be measured for a time period that extends beyond the end of the second time period. For example, the current may be pulsed for 5 milliseconds (with a 95 millisecond off stage due to the 5% duty cycle) though the voltage and current may be measured over a period of up to or exceeding 10 seconds. The moving average and maximum voltage drop for the voltage and current values over the measurement time period may be determined after collecting the data. The look up table may then be referenced based on the moving average and maximum voltage drop to determine the power cable resistance value. The user device 102 may boot up in a first state in response to determining that the determined resistance is within a threshold amount of a resistance value associated with the USB power adapter A 104. The first state may be a full performance mode where the device operates in a high-performance profile that may consume greater power and may provide improved performance. If the resistance is outside of the threshold amount, then the user device may boot in a second state or not boot at all and may shut down. The second state may be a low performance mode where power consumption of the components of the device is limited. In some examples, the user device 102 may also generate and display a message indicating that the device is in the second state and recommending connecting a compatible USB power source to achieve performance in the first state.

Though described with respect to the PoE to USB adapter 110, the technique described above may be implemented for any USB power adapter to detect power delivery capability, for example to determine if power delivery capability at least meets the power delivery capability of a manufacturer recommended power adapter, such as USB power adapter A 104.

Figure 2:
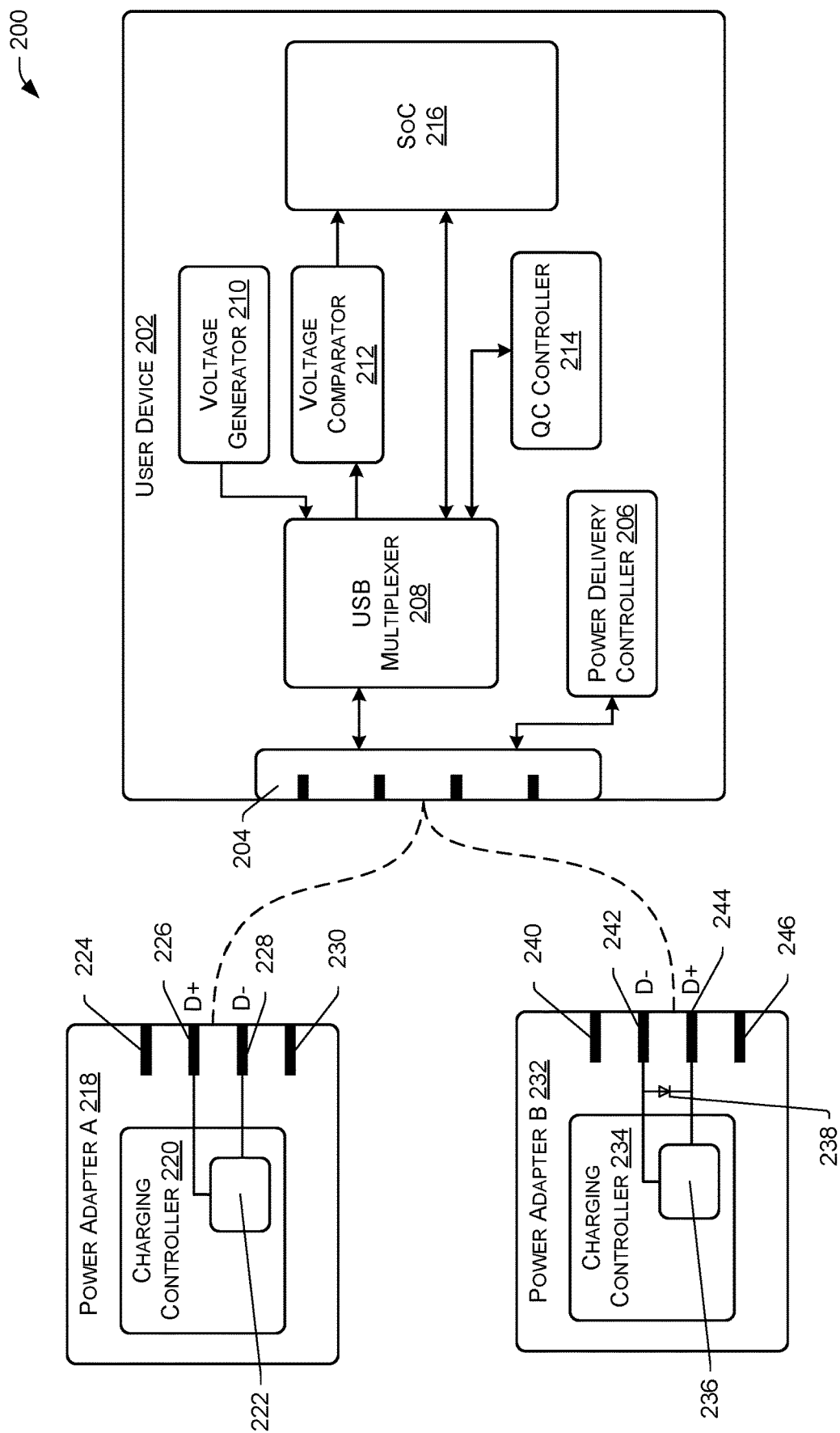
FIG. 2 illustrates a system diagram of a user device and multiple different power adapters that have different power delivery attributes and individually detectable by the user device, according to at least some examples.

FIG. 2 illustrates a system diagram 200 of a user device 202 and multiple different power adapters that have different power delivery attributes and are individually detectable by the user device 202, according to at least some examples. The user device 202 may be similar or identical to the user device 102 of FIG. 1. The user device 202 includes a USB connector 204, a power delivery controller 206, a USB multiplexer 208, a voltage generator 210, a voltage comparator 212, a QC controller 214, and a System-on-a-Chip (SoC 216). The system diagram 200 may illustrate only a portion of the components of the user device 202.

The USB connector 204 includes connections for power, ground, D+ signal, D− signal, and one or more configuration channels (CC). The power delivery controller 206 may be configured to detect signals over the CC lines of the USB connector 204 to identify particular connectors, such as USB Type-C connections. The USB multiplexer 208 enables the USB connector 204 of the user device 102 to be switched between different components or powered off entirely. For example, the USB multiplexer 208 may enable connection of the USB connectors to the voltage generator 210, voltage comparator 212, and other components. The voltage generator 210 may be used to produce and/or cause output of a voltage signal at a predetermined voltage value across the D+ and/or D− signal connectors. The voltage comparator 212 may detect a signal returned from the D+ and/or D− signal connectors. The QC controller 214 may be configured for controlling charging and/or power delivery to the user device 202 from the USB connector 204. The SoC may represent a system for controlling power configuration on the user device 202 and may be part of one or more systems within the user device 202.

The power adapter A 218 may be a third party or generic power adapter to provide power via a USB connector to the user device 202. The power adapter A 218 may include a power connector 224, a D+ signal connector 226, a D− signal connector 228, and a ground connector 230. The power adapter A 218 also includes a charging controller 220 that may be an integrated circuit to control operation of the power adapter A 218. The charging controller 220 may include, among other components, a transistor 222 that may be communicably coupled to the D+ signal connector 226 and the D-signal connector 228. The power adapter A 218 may not be capable of providing power to the user device 202 at a specified power requirement, for example, the power adapter A 218 may not be configured to meet the peak power requirement of the user device 202.

The power adapter B 232 may include a third party or original equipment manufacturer (OEM) device for providing power to the user device 202. The power adapter B 232 described herein may provide increased power delivery attributes over the power adapter A 218. For example, the power adapter B 232 may be capable of providing 12 watts of power at 9 volts up to a peak power of 30 watts while the power adapter A 218 may be capable of providing 18 watts of power at 9 volts at a peak power level. The power may be sourced from one or more sources, such as an electrical outlet, battery-powered source, generator, or other electrical source and provided through the power connector 224. The power adapter B 232 also includes a ground connector 230 for providing a ground through the power adapter B 232 to the user device 202 as part of the power supply. The D+ signal connector 244 and the and D− signal connector 242 may be used to detect an initial connection of a power adapter to the user device 202. The power adapter B 232 also includes a power connector 240 and a ground connector 246. The power adapter B 232 further includes a charging controller 234 that may control one or more charging operations across the power adapter B 232. Within the charging controller 234, various components may be used for detection of the USB adapter by devices, and control of output power, such as output voltage, current, and/or wattage. The charging controller 234 includes a transistor 236 (such as a Field Effect Transistor (FET) and/or a Metal-Oxide-Semiconductor Field Effect Transistor (MOSFET)) that may be used to amplify and/or switch signals within the power adapter B 232, for example to change signals between different voltage signals or other such changes within the power adapter B 232.

The power adapter B 232 also includes a diode 238 that is communicably coupled between the D+ and the D− signal connectors. The diode 238 is connected in parallel with the transistor 236 and/or the charging controller 234. The diode 238 therefore may be used to provide a signal that is detectable at the user device 202 when connected indicative of the type of power adapter, specifically that the power adapter is the power adapter B 232 with the power delivery capabilities associated therewith. The diode 238 provides a voltage loopback between the D+ signal connector 244 and D− signal connector 242 that is detectable at the user device 202 and may be used for authentication of the power adapter B 232 as a power supply compatible with the power requirements of the user device 202.

Detection of the power adapter B 232 may be performed using the components within the user device 202. Upon power up or booting of the user device 202, the QC controller 214 will detect a power connection with a requirement for a particular power adapter source type for the user device 202. When a power source is detected by the QC controller 214, the USB multiplexer 208 will cause the D− signal connector 242 of the USB connector 204 to receive a voltage signal from the voltage generator 210. The voltage signal may, for illustrative purposes, be a 3.3-volt signal from the voltage generator 210. The USB multiplexer 208 will also cause the voltage comparator 212 to be connected with the D+ signal connector 244. When the voltage comparator 212 determines that the voltage on the D+ signal connector 244 is less than a threshold value, 2.8 volts for example, then the voltage comparator 212 may generate a signal to deliver to a management component of the user device 202, such as the SoC 216 that manages one or more operations of the user device 202. The SoC 216 will boot up in a first state in response to receiving the signal from the voltage comparator 212. The first state may be a full performance mode where the device operates in a high-performance profile that may consume greater power and may provide improved performance. If the voltage comparator 212 does not convey the signal to the SoC 216, or if the signal indicates that the power supply is not returning the expected voltage across the D+ signal connector 244, then the SoC 216 will cause the user device 202 to boot in a second state. The second state may be a low performance mode where power consumption of the components of the user device 202 is limited, for example by throttling performance of one or more components, such as a processor of the device. In some examples, the device may also generate and display a message indicating that the device is in the second state and recommending connecting a compatible USB power adapter to achieve performance in the first state.

Figure 3:
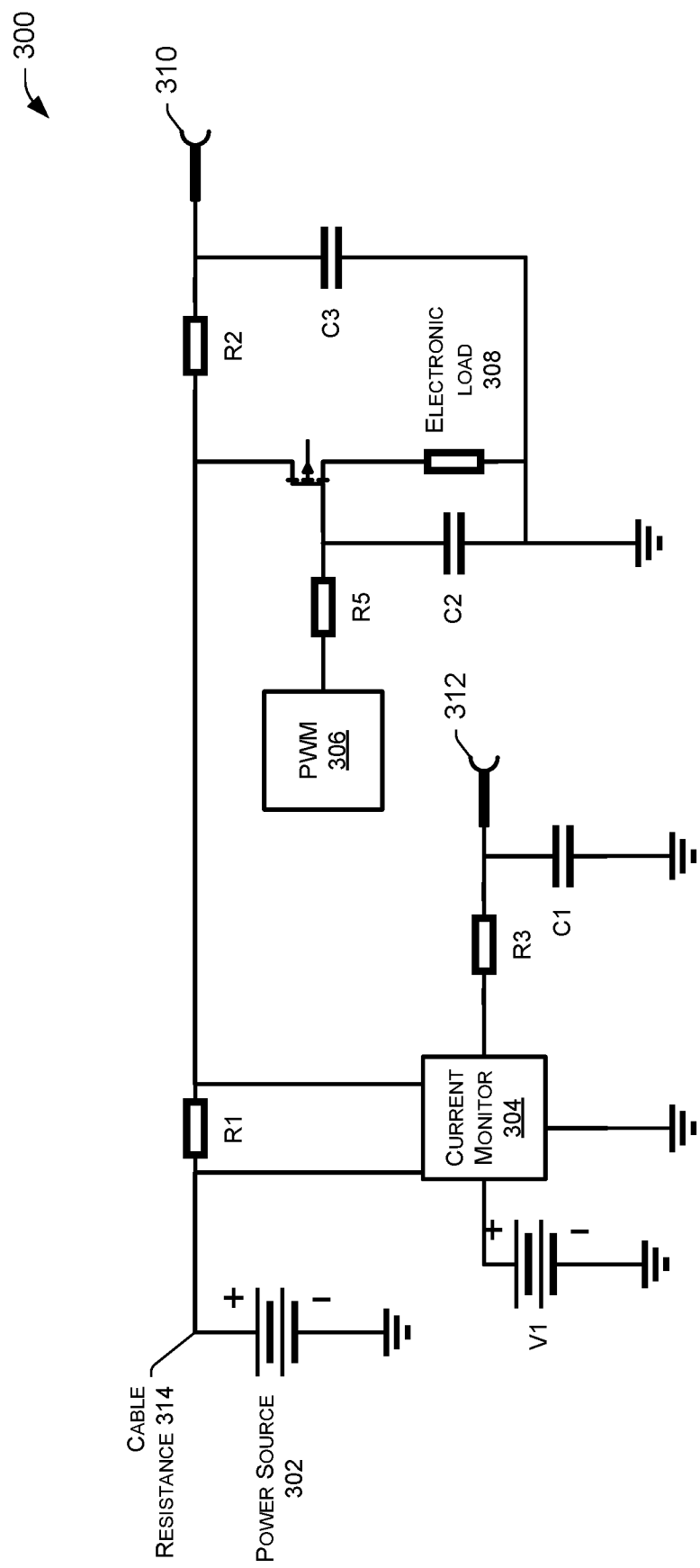
FIG. 3 illustrates a simplified circuit diagram of a portion of a user device that may be used for USB power adapter detection, according to at least some examples.

FIG. 3 illustrates a circuit diagram 300 of a portion of a user device that may be used for USB power adapter detection, according to at least some examples. The user device may be the user device 102 of FIG. 1 and/or the user device 202 of FIG. 2. In the circuit diagram 300, a portion of the SoC 216 of FIG. 2 is depicted. In particular, the circuit diagram 300 illustrates a portion adjacent an ADC of the user device 202 for detecting a voltage and current of the ADC.

In the circuit diagram 300, current and voltage monitoring devices as well as an electronic load 308 are connected to the ADC. The electronic load 308 serves as a representative load such that the device may draw current from the power source. The electronic load 308 may be varied and/or controlled based on a pulse width modulation 306 to change the simulated load on the circuit. The circuit diagram includes a representation of the power source 302, a cable resistance 314 adjacent the power source that may be used to determine a type of power adapter, a current monitor 304, and sampling locations for a current 312 across the ADC and a voltage 310 across the ADC.

Initially, a look up table may be created for the device by sampling voltage and current at the ADC, specifically at the voltage 310 and current 312 locations, using varying measurable resistance at the cable resistance 314. Through testing on user devices with varying resistance, using a variable resistor for the cable resistance 314, current 312 and voltage 310 values at the ADC may be charted in the look up table to correspond with cable resistance 314 for the power cable. The look up table may be stored in a storage medium on the user device 202 and accessible during a booting process of the user device 202. The table below includes an example look up table that may be generated for the device. The voltage and current values at the ADC are charted against different cable resistance values using a high precision variable resistor in place of the cable. An average value of measured results from a sample of devices is stored in the table.

formance of the user device 202. The SoC 216 will boot up the user device 202 in a first state in response to determining that the resistance is below the threshold, which is indicative of the power adapter being capable of delivering the full performance power requirements of the user device 202. The first state may be a full performance mode where the user device 202 operates in a high-performance profile that may consume greater power and may provide improved performance. If the resistance is above the threshold value, then the SoC 216 will cause the user device to boot in a second state. The second state may be a low performance mode where power consumption of the components of the user device 202 is limited. In some examples, the user device 202 may also generate and display a message indicating that the device is in the second state and recommending connecting a compatible power source to achieve performance in the first state.

The user device 202 may also be capable of detecting and/or verifying a peak power capability of the power adapter using the components described herein. In some examples, the user device 202 may verify the peak power capability by applying a pulse load on the user device's input supply, for example using the electronic load 308, and recording the voltage 310 during the pulse load. In a more

| Cable Resistance | ADC Current (No Load) | ADC Current (Constant Load) | ADC Current Pulsed Load) | ADC Voltage (No Load) | ADC Voltage (Full Load) | ADC Voltage (Pulsed Load) |
|---|---|---|---|---|---|---|
| 150 mOHM | 0.5 A | 1.5 A | 2.2 A | 8.925 V | 8.775 V | 8.670 V |
| 155 mOHM | 0.5 A | 1.5 A | 2.2 A | 8.9225 V | 8.7675 V | 8.659 V |
| . . . | . . . | . . . | . . . | . . . | . . . | . . . |
| 500 mOHM | 0.5 A | 1.5 A | 2.2 A | 8.750 V | 8.250 V | 7.900 V |

After the look up table shown above is generated, the look up table may be stored or accessed by the device for determining power capabilities of the device. During power detection on the user device 202, a cable resistance 314 is estimated using the look up table and voltage 310 and current 312 at the ADC when connected to the power source 302. Sampling the voltage 310 and current 312 may include sampling at varying loads, for example by sampling a first voltage value at voltage 310 for a first period of time while no load is at the ADC. Subsequently, after the first period of time, the electronic load 308 may be configured, by the pulse width modulation 306, to draw a first current during a second period of time. The voltage 310 at the ADC may be sampled again at the second period of time. Using the voltage 310 at the first period of time, the voltage 310 at the second period of time, the load of the electronic load 308, and the look up table, the cable resistance 314 and/or the power capability of the power source 302 may be determined. For example, by using a variable load, the over current protection of the power source may be triggered that may cause the power source to attempt to lower the voltage of the power, which may be detected by the current monitor 304 and thereby determine the power capability of the power source 302. In some examples, the cable resistance 314 may be determined by subtracting the voltage during the second period of time from the voltage during the first period of time and dividing the result by the amperage value of the load at the electronic load 308. When the cable resistance 314 is greater than a threshold amount, it may be indicative of the power adapter not being compatible, e.g., not being capable of supplying the power requirements for full perparticular example, during the boot up process for the user device, if a QC adapter is detected, meaning an adapter that may not be capable of providing the power requirements for the user device 202, then the user device 202 may cause the SoC 216 to configure to ADC for sampling data at a first sampling rate for a first time period. The sampling rate may be a rate of 1 kilohertz, though other rates may be used. The voltage 310 at the ADC during the first time period may be determined as a voltage without any load on the ADC. The electronic load 308 may then be configured to pulse a current 312 for a second time period. The current 312 may be a peak current and may be pulsed with a particular duty cycle, such as a 5% duty cycle during the pulsing. During the second time period, the voltage 310 at the ADC is measured, as well as the current 312 at the ADC. In some examples, the voltage 310 and current 312 may be measured for a time period that extends beyond the end of the second time period. For example, the current may be pulsed for 5 milliseconds (with a 95 millisecond off stage due to the 5% duty cycle) though the voltage and current may be measured over a period of up to or exceeding 10 seconds. The moving average and maximum voltage drop for the voltage and current values over the measurement time period may be determined after collecting the data. The look up table may then be referenced based on the moving average and maximum voltage drop to determine the power cable resistance value. The SoC 216 will boot up in either the first state or the second state in response to determining that the resistance is within a threshold amount of a resistance value associated with the power adapter.

Figure 4:
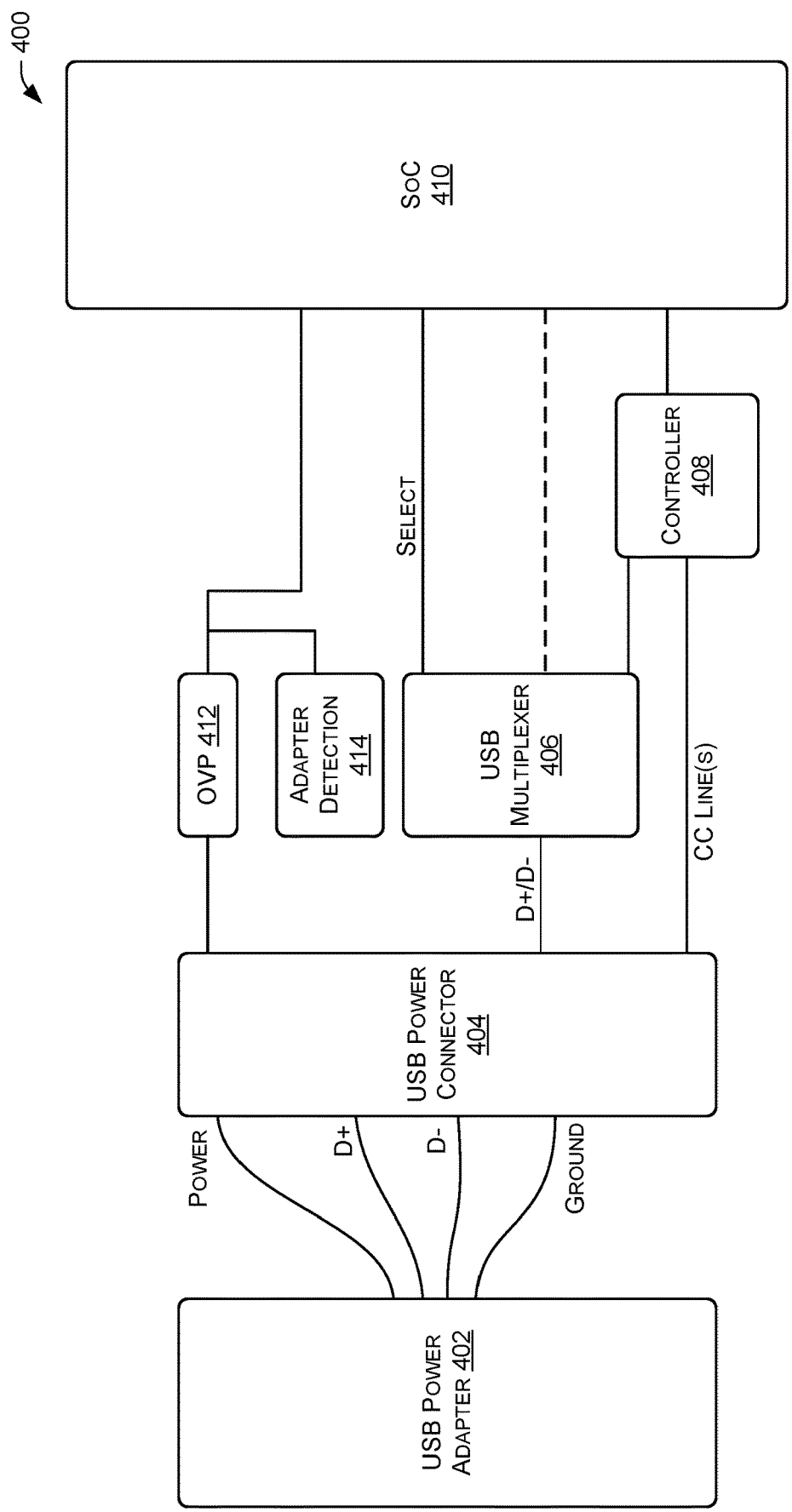
FIG. 4 illustrates an example configuration of a user device to detect a compatible USB power adapter, according to at least some examples.

FIG. 4 illustrates an example configuration of a user device 400 to detect a compatible USB power adapter, according to at least some examples. The USB power adapter 402 may be configured to provide power to the user device 400 through a USB power connector 404. The user device 400 may be configured to operate and receive power from a 9-volt power supply. The USB power adapter 402 may be a specific user device manufacturer recommended power adapter that provides power at 5 volts and/or 9 volts via a high voltage downstream charge port. The USB power adapter 402 may be rated for 12-watt average power with peak power delivery up to 30 watts.

The user device 400 includes an SoC 410 that may be similar or identical to the SoC 216 described with respect to FIG. 2. The user device 400 also includes a USB power connector 404 to receive a USB connection from the USB power adapter 402. The user device 400 also includes a USB multiplexer 406 that may be the same as the USB multiplexer 208 of FIG. 2 and a controller 408 that may be similar or identical to the power delivery controller 206 of FIG. 2. The user device 400 further includes an over voltage protection device to protect the user device 400 against power delivery at a high voltage. The user device 400 further includes an adapter detection device 414 that may include components such as the voltage generator 210 and the voltage comparator 212 of FIG. 2. The adapter detection device 414 may be configured to detect a compatible power adapter as described with respect to FIG. 2.

During operation, the USB power adapter 402 is connected to the user device 400 at the USB power connector 404. After connection is detected, the controller 408 performs an identification using the CC lines of the USB power connector 404 (if available) to check for a particular configuration of power adapter. If no response is received from the CC lines, then the adapter detection device 414 may perform a detection technique as described with respect to FIG. 2 to detect whether the USB power adapter 402 is compatible with the user device 400 and associated power requirements. In doing so, the adapter detection device 414 may communicate with the USB multiplexer 406 to connect to the D+ and D− signal connectors and produce and/or detect voltage across the D+ and D− signal connectors.

The SoC 410 may confirm the input voltage of the power adapter, for example to confirm the input voltage is set or changed to 9 volts. In response to detecting the change to 9 volts and/or the compatibility of the USB power adapter 402, the SoC 410 will boot up in the first state described herein. Otherwise, the SoC 410 will boot in the second state, shut down, and/or display a message to prompt a user to connect a USB power adapter 402.

Figure 5:
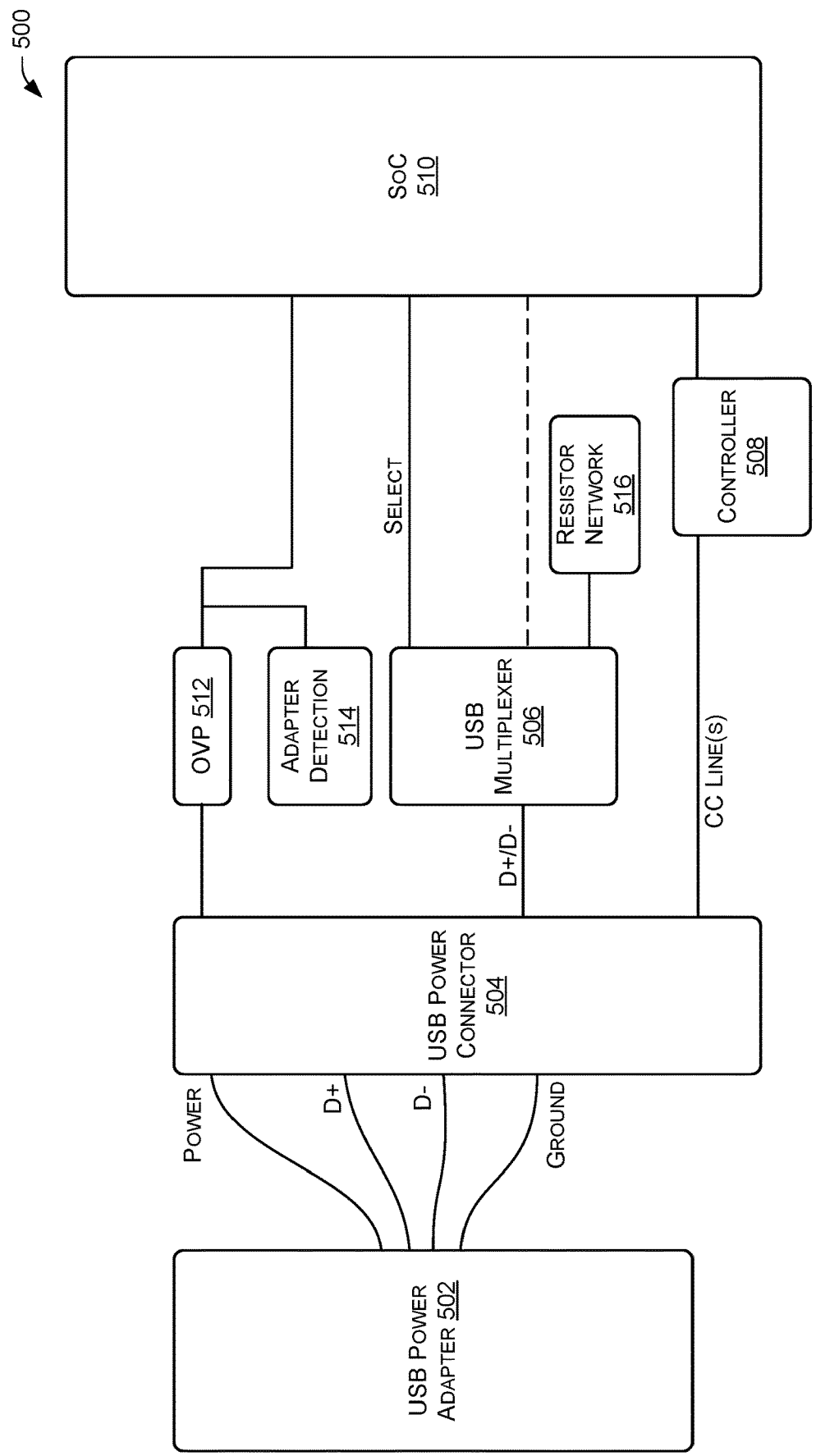
FIG. 5 illustrates an example configuration of a user device to detect a compatible USB power adapter, according to at least some examples.

FIG. 5 illustrates an example configuration of a user device 500 to detect a compatible USB power adapter, according to at least some examples. The USB power adapter 502, USB power connector 504, USB multiplexer 506, controller 508, SoC 510, OVP 512, and adapter detection device 514 may be similar to the USB power adapter 402, USB power connector 404, USB multiplexer 406, controller 408, SoC 410, OVP 412, and adapter detection device 414 described with respect to FIG. 4.

During operation, the USB power adapter 502 is connected to the user device 500 at the USB power connector 504. After connection is detected, the controller 408 performs an identification using the CC lines of the USB power connector 504 (if available) to check for a particular configuration of power adapter. If no response is received from the CC lines, then the adapter detection device 514 may perform a detection technique as described with respect to FIG. 2 to detect whether the USB power adapter 502 is compatible with the user device 400 and associated power requirements. In doing so, the adapter detection device 514 may communicate with the USB multiplexer 506 to connect to the D+ and D− signal connectors and produce and/or detect voltage across the D+ and D− signal connectors. In some examples, a resistor network 516, for example including the configuration shown and described with respect to FIG. 3, may be used to detect the power compatibility of the USB power adapter 502.

The resistor network 516 may include a detection circuit that may be a simplified form the of the circuit diagram depicted in FIG. 3 to ensure the USB power adapter 502 powering the device can supply the power required. For instance, a MOSFET may be implemented with a load resistor to detect a voltage drop using the ADC. Drawing current from the power input using the MOSFET and the resistor may enable detection of voltage drop that may be used to calculate the peak power available from the USB power adapter 502.

The SoC 510 may confirm the input voltage of the power adapter, for example to confirm the input voltage is set or changed to 9 volts. In response to detecting the change to 9 volts and/or the compatibility of the USB power adapter 502, the SoC 510 will boot up in the first state described herein. Otherwise, the SoC 510 will boot in the second state, shut down, and/or display a message to prompt a user to connect a USB power adapter 502.

Figure 6:
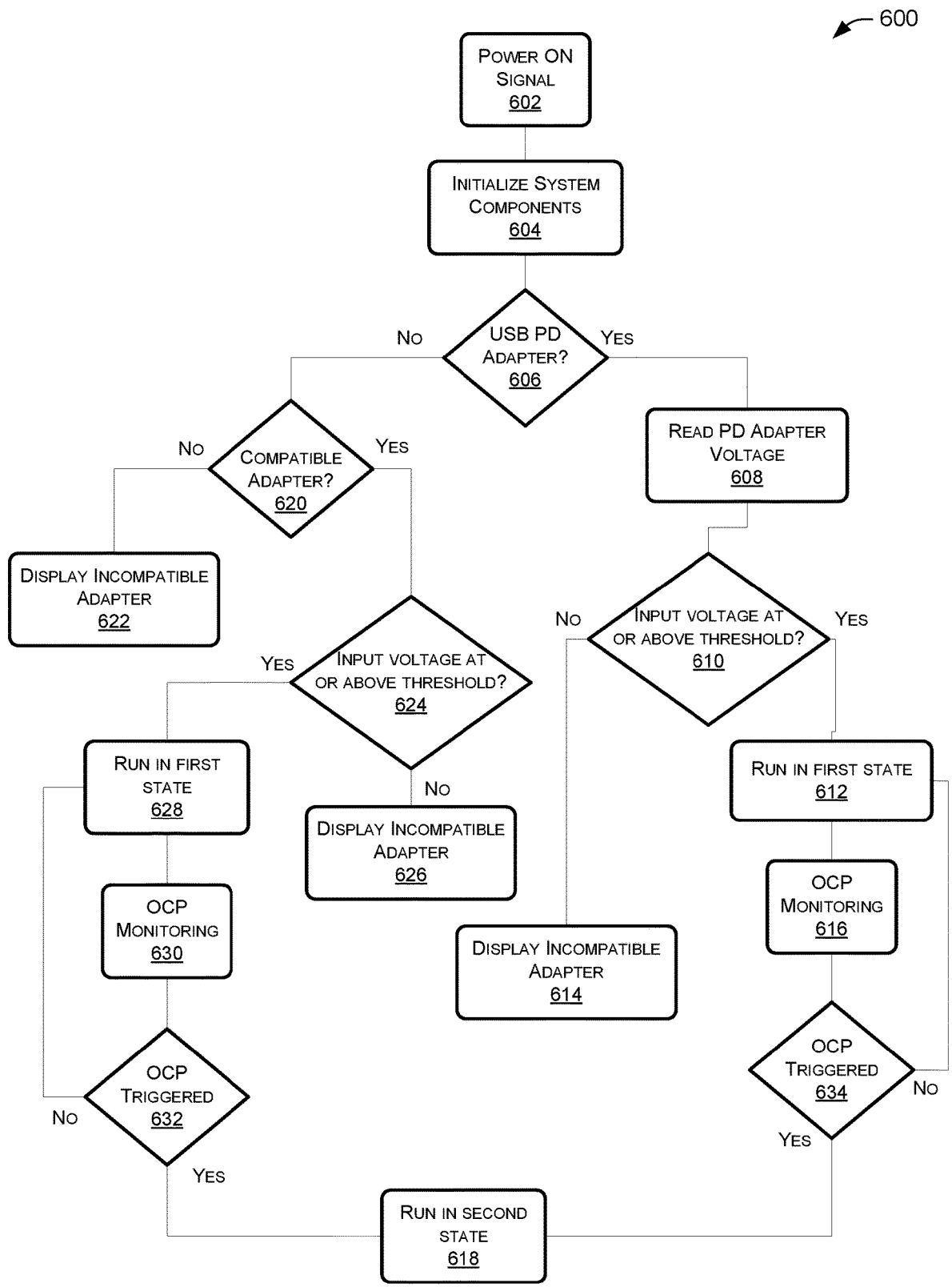
FIG. 6 illustrates a logical flow diagram of a process for booting a user device and detecting power delivery attributes of a USB power adapter, according to at least some examples.

FIG. 6 illustrates a logical flow diagram of a process 600 for booting a user device and detecting power delivery attributes of a USB power adapter, according to at least some examples. The process 600 beings with receiving a power on signal 602 for a user device which may coincide with a connection of a USB power adapter with the user device. At 604, the system components 604 of the user device initialize and begin to boot up in response to the power on signal 602.

At 604, the process 600 includes determining whether the USB power adapter is a power adapter meeting a power delivery (PD) specification. Determining the PD specification may include detecting a type of adapter using CC lines of a USB adapter and/or according to the techniques described with respect to FIGS. 2 and 3 herein.

In the event that the USB power adapter is a PD adapter at 606, then the user device will read a voltage at 608. The voltage is a voltage of the power input supplied by the USB power adapter. At 610 the voltage is measured against a threshold to determine if the input voltage is at or above a threshold, such as a 9-volt threshold for a user device that requires a 9-volt input, or whether the voltage remains below the 9-volt threshold. In some examples, the voltage may be measured for a period of time before comparing against the threshold. In the event that the voltage is below the threshold, at 614, the user device may display a message that the USB power adapter is incompatible and/or stop booting and shut down.

In the event that the input voltage meets or exceeds the threshold at 610, the user device may boot in a full performance mode, the first state, as described herein at 612. The user device may then be used by the user and may draw power through the USB power adapter. While operating, the user device may evaluate whether the USB power adapter is continuing to meet the power draw requirements. For example, the USB adapter may be a PD adapter and may meet the voltage threshold but may not meet the peak power delivery requirement of the user device. The user device may monitor current supplied by the USB adapter at 616 to ensure the user device and adapter are protected against overcurrent. In the event that the overcurrent is detected at 634, then the user device changes, at 618, to a second state, a low performance state that may reduce a peak power requirement from the USB power adapter. In some examples, at 618, the user device may shut down. In the event that no overcurrent is detected at 634, then the user device may continue to operate in the first state. In some examples, prior to changing to the second state, the user device may prompt the user to notify them of the incompatible adapter and/or that the power supply is not capable of providing the required power and request input from the user to either shut down or to operate in the second state.

While operating, the user device may evaluate whether the USB power adapter is continuing to meet the power draw requirements. For example, the USB adapter may be a PD adapter and may meet the voltage threshold but may not meet the peak power delivery requirement of the user device. In such an event, at 616, the USB power adapter is determined to not meet the power requirements and the user device changes, at 618, to a second state, a low performance state that may reduce a peak power requirement from the USB power adapter. In some examples, at 618, the user device may shut down.

In the event that the USB power adapter is determined not to be a PD adapter at 606, the user device may perform, at 620, one or more checks, as described herein, to determine whether the USB adapter is compatible, meaning it can meet the power delivery requirements. In the event that the USB adapter is determined not to be compatible, the user device may display a message that the adapter is incompatible and shuts down at 622.

In the event that the one or more processes for identifying the USB power adapter described herein confirms the USB adapter is compatible, the process 600 proceeds to 624 where the user device will read a voltage. The voltage is a voltage of the power input supplied by the USB power adapter. At 624 the voltage is measured against a threshold to determine if the input voltage is at or above a threshold, such as a 9-volt threshold for a user device that requires a 9-volt input, or whether the voltage remains below the 9-volt threshold. In some examples, the voltage may be measured for a period of time before comparing against the threshold. In the event that the voltage is below the threshold, at 626, the user device may display a message that the USB power adapter is incompatible and/or stop booting and shut down.

In the event that the input voltage meets or exceeds the threshold at 624, the user device may boot in a full performance mode as described herein at 628. The user device may then be used by the user and may draw power through the USB power adapter. While operating, the user device may evaluate whether the USB power adapter is continuing to meet the power draw requirements. For example, the USB adapter may be a PD adapter and may meet the voltage threshold but may not meet the peak power delivery requirement of the user device. The user device may monitor current supplied by the USB adapter at 630 to ensure the user device and adapter are protected against overcurrent. In the event that the overcurrent is detected at 632, then the user device changes, at 618, to a second state, a low performance state that may reduce a peak power requirement from the USB power adapter. In some examples, at 618, the user device may shut down. In the event that no overcurrent is detected at 632, then the user device may continue to operate in the first state.

Figure 7:
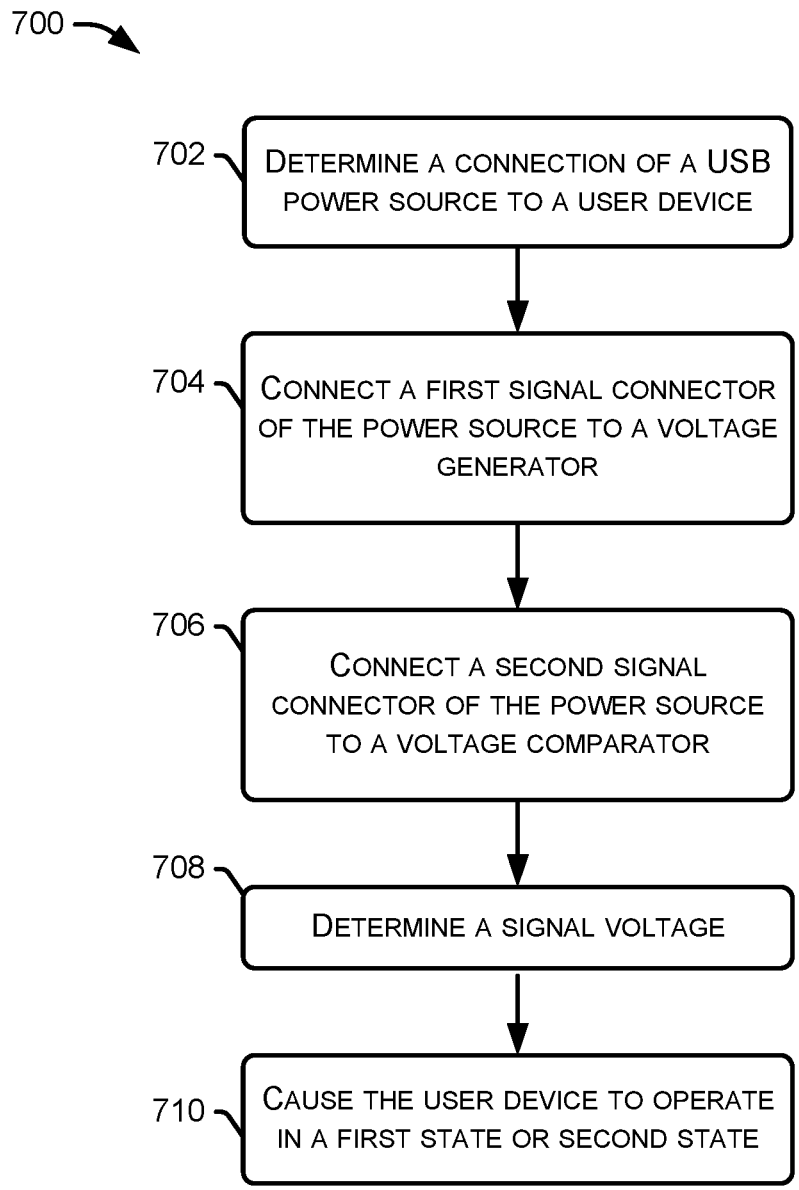
FIG. 7 is a flow diagram of a process to detect a USB power adapter having power delivery attributes, according to at least some examples, according to at least some examples.

FIG. 7 is a flow diagram of a process 700 to detect a USB power adapter having power delivery attributes, according to at least some examples. The process 700 may be performed, at least in part, by a processor of a computing device, such as the user device and/or a subsystem of the user device. The process 700 may be performed on one or more devices within the user device. The process 700 may be implemented as processor-executable instructions that may be stored on a suitable non-transitory storage medium. Though depicted in a particular order in FIG. 7, the steps of process 700 may be performed in other orders or arrangements, and in some examples, process 700 may include additional or fewer steps than depicted in FIG. 7.

At 702, the process 700 includes determining a connection of a USB power source to a user device. The connection may be detected based on connections and signals between D+, D−, and/or CC signal lines of the USB power source. In some examples, the connection may be detected by a charge controller of the user device.

At 704, the process 700 includes connecting a first signal connector of the USB power source to a voltage generator of the user device. The first signal connector may be the D− signal connector of the USB connector and may be coupled to an integrated circuit of the USB power source.

At 706, the process 700 includes connecting a second signal connector of the power source to a voltage comparator. The second signal connector may include the D+ signal connector of the USB connector and may also be coupled to the integrated circuit of the USB power source. In some examples, the D+ and D− signal connectors may be connected via the integrated circuit, which includes a transistor, and also with a diode that is arranged in parallel with the transistor to connect between the D+ and D− signal connectors.

At 708, the process 700 includes determining a signal voltage on the second signal connector. The signal voltage may be measured from the D+ signal connector and compared against a threshold. The threshold may be determined based on a threshold voltage that a USB power adapter including a diode as described herein allows to pass around the voltage loop formed by the D+ signal connector, D− signal connector, and diode.

At 710, the process 700 includes causing the user device to operate in a first state or a second state based on the signal voltage. In response to the signal voltage being below a threshold, the presence of the diode may be determined, and the user device may operate in a full performance mode. In response to the signal voltage being greater than the threshold, the diode may be detected to be absent, and the user device may operate in a low performance mode.

Figure 8:
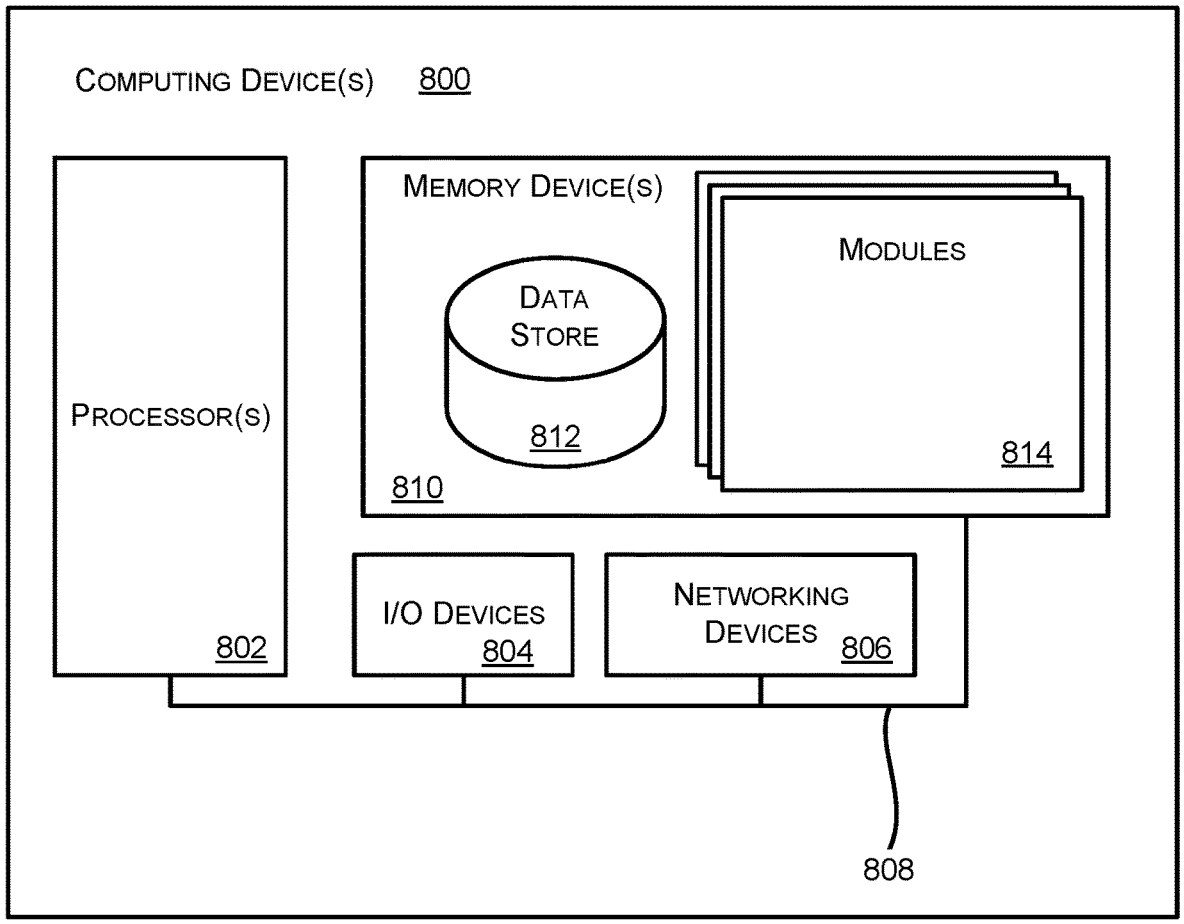
FIG. 8 illustrates a block diagram of a computing system for use in USB power source detection, according to at least some examples.

FIG. 8 illustrates a block diagram of a computing device 800 for use in USB power adapter detection, according to at least some examples. In some examples, the processes and techniques may be implemented with firmware as part of a device rather than as software operated on the computing device 800. The computing device 800 may include one or more computing devices on which services or modules of this technology may execute. The computing device 800 is illustrated on which a high-level example of the technology may be executed. The computing device 800 may be an example of a component, such as the SoC or other component of the device that may perform the USB power adapter detection described herein. The computing device 800 may include one or more processors 802 that are in communication with memory devices 810. The computing device 800 may include a local communication interface 808 for the components in the computing device. For example, the local communication interface 808 may be a local data bus and/or any related address or control busses as may be desired.

The memory device 810 may contain modules 814 that are executable by the processor(s) and data for the modules 814. The modules 814 may include modules for carrying out the techniques and processes described herein, such as the process 700 described with respect to FIG. 7, or other techniques included herewith. A data store 812 may also be located in the memory device 810 for storing data related to the modules and other applications along with an operating system that is executable by the processor 802.

Various applications may be stored in the memory device 810 and may be executable by the processor 802. Components or modules discussed in this description that may be implemented in the form of software using high programming level languages that are compiled, interpreted or executed using a hybrid of the methods.

The computing device 800 may also have access to I/O (input/output) devices 804 that are usable by the computing devices. An example of an I/O device 804 is a display screen that is available to display output from the computing devices. Other known I/O device may be used with the computing device as desired. Networking devices 806 and similar communication devices may be included in the computing device 800. The networking devices 806 may be wired or wireless networking devices 806 that connect to the internet, a LAN, WAN, or other computing network.

The components or modules that are shown as being stored in the memory device 810 may be executed by the processor 802. The term "executable" may mean a program file that is in a form that may be executed by a processor 802. For example, a program in a higher-level language may be compiled into machine code in a format that may be loaded into a random-access portion of the memory device 810 and executed by the processor 802, or source code may be loaded by another executable program and interpreted to generate instructions in a random-access portion of the memory to be executed by a processor 802. The executable program may be stored in any portion or component of the memory device 810. For example, the memory device 810 may be random access memory (RAM), read only memory (ROM), flash memory, a solid-state drive, memory card, a hard drive, optical disk, floppy disk, magnetic tape, or any other memory components.

The processor 802 may represent multiple processors and the memory device 810 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. The computer readable storage medium may, for example, be in the form of a non-transitory computer readable storage medium. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

It is noted that any of the distributed system implementations described above, or any of their components, may be implemented as one or more web services. In some implementations, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke and may define a particular application programming interface (API) to which other systems may be expected to conform when requesting the various operations.

In various implementations, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some implementations, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A universal serial bus (USB) power adapter comprising:
   a power connector that provides power through the USB power adapter to a device;
   a ground connector that provides a ground for power delivery through the USB power adapter to the device;
   a first data signal connector that provides data communication to the device;
   a second data signal connector that provides data communication to the device;
   a transistor communicably coupled between the first data signal connector and the second data signal connector; and
   a diode communicably coupled between the first data signal connector and the second data signal connector.

2. The USB power adapter of claim 1, wherein:
   the transistor comprises a field-effect transistor communicably coupled with an integrated circuit of the USB power adapter; and
   the transistor is communicably coupled to the first data signal connector and the second data signal connector.

3. The USB power adapter of claim 1, wherein the transistor and the diode are arranged in parallel between the first data signal connector and the second data signal connector.

4. The USB power adapter of claim 1, wherein:
   an integrated circuit comprises the transistor; and
   the integrated circuit is coupled to the first data signal connector and the second data signal connector.

5. A power supply system, comprising:
   a first power connector;
   a second power connector;
   a first data signal connector;
   a second data signal connector;
   a transistor communicably coupled between the first data signal connector and the second data signal connector; and
   a diode communicably coupled between the first data signal connector and the second data signal connector.

6. The power supply system of claim 5, wherein:
   the power supply system is configured to deliver, via the first power connector and the second power connector, an average power of twelve watts; and
   the power supply system is configured to deliver, via the first power connector and the second power connector, a peak power of thirty watts.

7. The power supply system of claim 5, wherein the diode is arranged between the first data signal connector and the second data connector, and causes a voltage drop over the diode detectable by a charge controller of a user device.

8. The power supply system of claim 5, further comprising an integrated circuit comprising control circuitry for the power supply system, and wherein the integrated circuit:
   is communicably coupled to the first data signal connector and the second data signal connector.

9. The power supply system of claim 8, wherein the diode is arranged in parallel with the integrated circuit between the first data signal connector and the second data signal connector.

10. The power supply system of claim 5, wherein the diode and the transistor are arranged in parallel between the first data signal connector and the second data signal connector.

11. The power supply system of claim 5, wherein the diode is arranged between the first data connector and the second data connector such that current only flows through the diode from the first data signal connector to the second data signal connector.

12. The power supply system of claim 5, wherein:
   a first voltage signal received at the first data signal connector drops to a second voltage signal across the diode; and
   the second voltage signal is transmitted to a user device via the second data signal connector.

13. A power adapter device, comprising:
- a power connector for providing power to a device;
- a first data signal connector;
- a second data signal connector;
- a transistor communicably coupled between the first data signal connector and the second data signal connector; and
- a diode communicably coupled between the first data signal connector and the second data signal connector.

14. The power adapter device of claim 13, further comprising an integrated circuit comprising control circuitry for a power supply system, and wherein the integrated circuit:
- is communicably coupled to the first data signal connector and the second data signal connector.

15. The power adapter device of claim 14, wherein the diode is arranged in parallel with the integrated circuit between the first data signal connector and the second data signal connector.

16. The power adapter device of claim 14, wherein the integrated circuit comprises the diode communicably coupled between the first data signal connector and the second data signal connector, the transistor and diode arranged in parallel between the first data signal connector and the second data signal connector.

17. The power adapter device of claim 13, wherein:
- a first voltage signal received at the first data signal connector drops to a second voltage signal across the diode; and
- the second voltage signal is transmitted to the device via the second data signal connector.

18. The power adapter device of claim 13, wherein the diode and the transistor are arranged in parallel between the first data signal connector and the second data signal connector.

19. The power adapter device of claim 13, wherein the diode is arranged between the first data signal connector and causes a voltage drop over the diode between a first voltage at the first data signal connector and a second voltage at the second data signal connector, the voltage drop detectable by a charge controller of the device.

\* \* \* \* \*